United States Patent Office 3,575,918
Patented Apr. 20, 1971

3,575,918
CATALYST AND METHOD OF POLYESTER POLYMERIZATION
David A. Daniels, Kendall Park, N.J., and Rowland L. Orem, Jr., Baltimore, and Edwin E. Lard, Bowie, Md., assignors to W. R. Grace & Co., New York, N.Y.
No Drawing. Filed Dec. 10, 1968, Ser. No. 782,734
Int. Cl. C08g 51/04, 17/00
U.S. Cl. 260—40
16 Claims

ABSTRACT OF THE DISCLOSURE

A catalyst, containing a ketone peroxide, e.g., methyl ethyl ketone peroxide, and an organic non-ketonic diperoxide, e.g., 2,5-dimethyl-2,5-bis(2-ethyl hexanoyl peroxy) hexane, is used to cure polyester resins containing over 900 p.p.m. of an inhibitor. A small amount of sodium methoxide can be used as part of the catalyst. More specifically, polyester resins containing 900 to 40,000 p.p.m. of inhibitors can be cured within 10 minutes to 24 hours with the novel catalyst.

BACKGROUND OF THE INVENTION

The invention herein described was made in the course of or under a contract or subcontract thereunder, with the Department of the Air Force, Department of Defense.

(1) Objectives of the invention

An object of this invention is to provide a process to cure polyester resins which contain very large amounts of inhibitors. A further object is to provide a novel catalyst for such a process. Other objects and advantages of this invention will be apparent to one skilled in the art from the following specification and claims.

(2) Prior art

It is generally known that the polymerization of polyester resin systems containing more than 100 parts per million (p.p.m.) of an inhibitor is extremely difficult and that the resultant cured resins generally have reduced physical properties. An inhibitor is a material whose primary function is to retard internal polymerization of the polyester constituent of the resinous composition.

A polymerization catalyst is disclosed in U.S. Patent No. 3,214,496 which comprises hydrogen peroxide, an organic peroxy compound and a monocarboxylic acid. U.S. Pat. No. 3,377,407 discloses a polymerization catalyst which comprises 3,3 - dimethyl-3,5-dihydroxy-1,2-peroxy-cyclopentane and methyl ethyl ketone peroxides. That patent states that rapid cures can be obtained when large amounts of inhibitors are present by increasing the quantity of the methyl ethyl ketone peroxide. The only examples utilized less than 100 p.p.m. of inhibitor. Also, it states that the effectiveness of the ketone peroxide is enhanced by the presence of a metal activator or an amine along with the metal activator. U.S. Pat. 3,188,363 discloses an inhibitor-stabilizer system (mixture of copper and hydrazine addition salts) which are promoters in the presence of polymerization catalysts, such as methyl ethyl ketone peroxide. The patent states that up to 10,000 p.p.m. of hydrazine addition salt and 800 p.p.m. of copper (based on the polyester resin) can be used. Example 46 discloses the use of methyl ethyl ketone peroxide to cure a polyester resin, containing 800 p.p.m. hydrazine hydrochoride, in about ⅔ hour. The use of 2,5-dimethyl-2,5-di(t-butyl-peroxy)hexane to crosslink polyethylene is disclosed in U.S. Pat. No. 3,086,966.

The use of mixtures of peroxides as unsaturated polyester polymerization catalysts is disclosed in Polyester Polymerization with Mixed Catalyst Systems, Lucidol Technical Publications, Wallace & Tiernan, Inc., Lucidol Division, Buffalo, N.Y. (undated, but stated to be based on a paper presented by Harrison et al. at the 1960 S.P.I. Reinforced Plastics Division meeting in Chicago, Illinois). That publication discloses the use of methyl ethyl ketone peroxide and di-t-butyl diperoxyphthalate to polymerize an unsaturated polyester resin containing 0.013 weight percent inhibitor (130 p.p.m.). That publication further disclosed that "the high-temperature component showed no appreciable activity" when tested at 212° F. In fact, 2,5-dimethylhexane-2,5-dihydroperoxide is stated to be an inhibitor when used in combination with methyl ethyl ketone peroxide to cure the low-inhibitor-content polyester resin.

BROAD DESCRIPTION OF THE INVENTION

The process of this invention includes curing polyester resin systems, preferably unsaturated polyesters, which contain over 900 p.p.m. of inhibitor. The process is extremely effective in curing polyester resin systems containing about 900 to about 40,000 p.p.m. of inhibitor. The cure takes from about 10 minutes to about 24 hours. The resultant cured polyester resin has very good properties. The polyester resin systems to be cured can contain promoters, fillers, etc. The curing is achieved by the use of a novel catalyst. Depending upon the amount of inhibitor present, from about 2 to about 10 weight percent of the novel catalyst can be utilized. The novel catalyst includes at least one ketone peroxide or hydroperoxide and at least one organic non-ketonic diperoxide or dihydroperoxide, the weight ratio of the two respective components ranging from about 2:1 to about 4:1. The ketone component can also be a polyperoxide or polyhydroperoxide, where poly is defined as two or more, i.e., di-, tri-, etc. As used within the scope of this invention, the term peroxide can include the term hydroperoxide and can include the mono- and polyperoxides. The catalyst can contain up to about 2 weight percent sodium methoxide if the inhibitor is of the phenolic type.

DETAILED DESCRIPTION OF THE INVENTION

The useful ketone monoperoxide compounds of this invention contain the groupings:

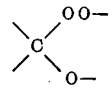

Several useful monoketone peroxides are the various methyl ethyl ketone peroxides,
methyl isobutyl ketone peroxides,
dimethyl ketone peroxides,
diethyl ketone peroxides,
di-n-undecyl ketone peroxides,
methyl vinyl ketone peroxides,
methyl phenyl ketone peroxides,
diphenyl ketone peroxides,
di-n-propyl ketone peroxides,
diisopropyl ketone peroxides,
di-n-butyl ketone peroxides,
di-sec-butyl ketone peroxides,
di-tert-butyl ketone peroxides,
di-n-amyl ketone peroxides,
di-n-hexyl ketone peroxides,
di-n-heptyl ketone peroxides,
di-n-octyl ketone peroxides,
di-n-decyl ketone peroxides,
di-n-tridecyl ketone peroxides,
di-n-heptadecyl ketone peroxides,
methyl n-propyl ketone peroxides,
methyl isopropyl ketone peroxides,
methyl n-butyl ketone peroxides, methyl isobutyl ketone peroxides,
methyl sec-butyl ketone peroxides,
methyl tert-butyl ketone peroxides,
methyl n-amyl butyl ketone peroxides,
methyl isoamyl ketone peroxides,
methyl n-hexyl ketone peroxides,
methyl isohexyl ketone peroxides,
methyl n-heptyl ketone peroxides,
methyl n-octyl ketone peroxides,
methyl n-nonyl ketone peroxides,
methyl n-decyl ketone peroxides,
methyl n-heptadecyl ketone peroxides,
ethyl n-propyl ketone peroxides,
ethyl n-butyl ketone peroxides,
propyl isopropyl ketone peroxides,
methyl cyclopropyl ketone peroxides,
methyl ethynyl ketone peroxides,
methyl isopropenyl ketone peroxides,
methyl propenyl ketone peroxides,
4-methyl-3-penten-2-one peroxides,
5-hexen-2-one peroxides,
3-hepten-2-one peroxides,
3,5-heptadien-2-one peroxides,
2,6-dimethyl-2,5-heptadien-5-one peroxides,
5-hydroxy-4-octanone peroxides,
1-chloro-2-propanone peroxides,
1-bromo-2-propanone peroxides,
1,1-dichloro-2-propanone peroxides,
1,3-dichloro-2-propanone peroxides,
cyclobutanone peroxides,
cyclopentanone peroxides,
pimelic peroxides,
2-methylcyclohexanone peroxides,
cycloheptanone peroxides,
cyclopentadecanone peroxides,
2-camphanone peroxides,
fenchone peroxides,
α-ionone peroxides,
3,5,5-trimethyl-2-hexen-1-one peroxides,
β-ionone peroxides,
carvone peroxides,
phenyl tert-butyl ketone peroxides,
phenyl butyl ketone peroxides,
phenyl propenyl ketone peroxides,
phenyl undecyl ketone peroxides,
phenyl vinyl ketone peroxides,
4-phenyl-3-buten-2-one peroxides,
methyl 2-naphthyl ketone peroxides,
methyl 1-naphthyl ketone peroxides,
chalcone peroxides,
ω-chloroacetophenone peroxides,
benzyl phenyl ketone peroxides,
1-naphthyl phenyl ketone peroxides,
α-hydroxy-α-phenylacetophenone peroxides,
biphenylene ketone peroxides,
N,N'-tetramethyl-4,4-diaminebenzophenone peroxides,
xanthone peroxides,
flavone peroxides, and
5-hydroxy-2-(hydroxymethyl)-4-pyrone peroxides.

The monoketones, which can be converted into useful analogous monoketone peroxides, can be prepared by the methods given in and references cited in Kirk-Othmer, Encyclopedia of Chemical Technology, 2nd Edition, Interscience Publishers, N.Y., Vol. 12 (1967), pp. 124–138.

Several useful 1,2-diketone peroxides are 1,2-cyclo-pentanedione peroxides,
3-methyl-1,2-cyclopentanedione peroxides,
1,2-cyclohexanedione peroxides,
2,3-butanedione peroxides,
2,3-pentanedione peroxides,
3,4-hexanedione peroxides,
4-methyl-2,3-pentanedione peroxides,
3,4-heptanedione peroxides,
5-methyl-2,3-hexanedione peroxides,
4,5-octanedione peroxides,
2,5-dimethyl-3,4-hexanedione peroxides,
2,2,5,5-tetramethyl-3,4-hexanedione peroxides,
diphenylglyoxal peroxides,
di-2-furfuroyl peroxides,
methylphenylglyoxal peroxides,
phenyl benzylglyoxal peroxides, and
4,4'-dimethoxybenzil.

The 1,2-diketones, which can be converted into useful analogous 1,2-diketone peroxides, can be prepared by the methods given in and references cited in Kirk-Othmer, Encylopedia of Chemical Technology, 2nd Edition, Interscience Publishers, N.Y., vol. 12 (1967), pp. 142–144.

Several useful 1,3-diketone peroxides are 2,4-pentanedione peroxides,
2,4-hexanedione peroxides,
2,4-heptanedione peroxides,
5-methyl-2,4-hexanedione peroxides,
5,5-dimethyl-2,4-hexanedione peroxides,
3-ethyl-2,4-pentanedione peroxides,
2,2-dimethyl-3,5-nonanedione,
3,3-diethyl-2,4-pentanedione,
1-cyclohexyl-1,3-butanedione peroxides,
5,5-dimethyl-1,3-cyclohexanedione peroxides,
1-phenyl-1,3-butanedione peroxides,
1-(4-biphenylyl)-1,3-butanedione peroxides,
1-phenyl-1,3-pentanedione peroxides,
1-phenyl-5,5-dimethyl-2,4-hexanedione peroxides,
1-phenyl-3-(2-methoxy-phenyl)-1,3-propanedione peroxides,
1-(4-nitrophenyl)-1,3-butanedione peroxides,
1-(2-furyl)-1,3-butanedione peroxides, and
1-(tetra-hydro-2-furyl)-1,3-butanedione.

The 1,3-diketones, which can be converted into useful analogous 1,3-diketone peroxides, can be prepared by the methods given in and reference cited in Kirk-Othmer, Encyclopedia of Chemical Technology, 2nd Edition, Interscience Publishers, N.Y., vol. 12 (1967), pp. 154–156.

Several useful 1,4-diketone peroxides are 2,5-hexanedione peroxides,
2,5-octanedione peroxides,
6-methyl-2,5-heptanedione peroxides,
2,5-decanedione peroxides,
2,5-undecanedione peroxides,
2,5-dodecanedione peroxides,
3,6-dodecanedione peroxides,
2,5-octadecanedione peroxides, and
11-methoxy-2,5-undecanedione peroxides.

The 1,4-diketones, which can be converted into useful analogous 1,4-diketone peroxides, can be prepared by the methods given in and references cited in Kirk-Othmer, Encyclopedia of Chemical Technology, 2nd Edition, Interscience Publishers, N.Y., vol. 12 (1967), pp. 159–161.

The useful ketone peroxide compounds are usually prepared by the addition of hydrogen peroxide, alkyl hydroperoxides, or peroxycarboxylic acids to the carbonyl group of the ketones. Ketones and hydrogen peroxide, in solution, give mixtures of addition and condensation products of structures (i) to (viii), which follow:

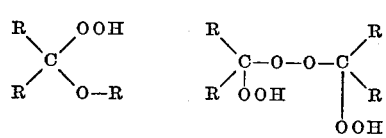

α-oxyhydroperoxides (i)

α,α'-dihydroperoxy peroxides (v)

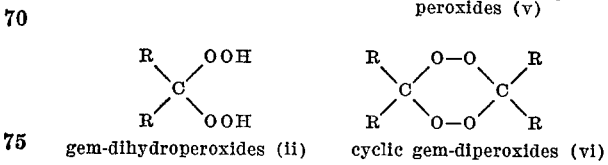

gem-dihydroperoxides (ii)

cyclic gem-diperoxides (vi)

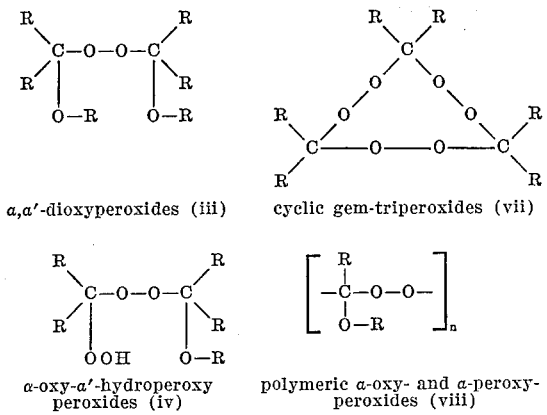

a,a'-dioxyperoxides (iii)  cyclic gem-triperoxides (vii)

a-oxy-a'-hydroperoxy peroxides (iv)  polymeric a-oxy- and a-peroxy-peroxides (viii)

wherein R can be the same or different alkyl, aralkyl or aryl radical, or hydrogen. The reaction conditions and the ketone structure determine which peroxy structure predominates and with the lower molecular weight ketones, most of these structures apparently exist in equilibrium. Polymeric peroxides of the general structure, $$H(OOCR_1R_2)_n\text{---}OOH,$$

wherein $R_1$ and $R_2$ are the same or different alkyl groups and/or branched alkyl groups, are also formed with many ketones, e.g., acetone, ethyl methyl ketone, and diethyl ketone.

U.S. Pat. No. 3,149,126 describes, among others, the following useful ketone peroxides:

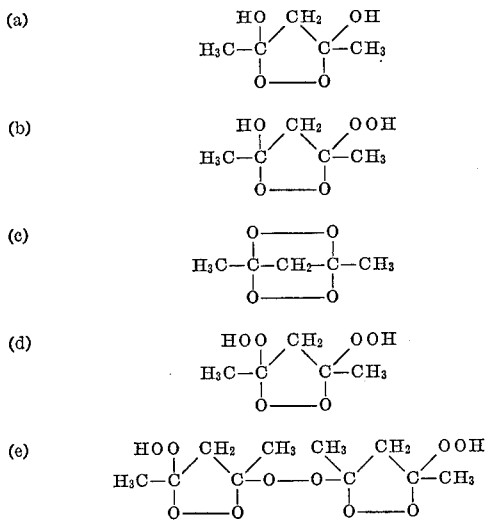

In many cases, to achieve a high degree of purity of one type of useful ketone peroxide, a relatively high boiling stabilizer must be added. An example of such a stabilizer is dimethyl phthalate.

Ethyl isoamyl ketone peroxide (an essentially pure product) can be made by the process given in U.S. Pat. No. 3,151,170.

In general, solvents which are suitable for the useful ketone peroxides are those organic solvents which have a relatively high volatility, that is, those having a boiling temperature below that of the ketone peroxide. In general, the preferred organic liquid solvents fall in the class of alkanols, glycols including ether glycols, ethers, ketones, esters, heterocyclic amides, and heterocyclic alcohols. Mixtures of these solvents may be used. Also, water containing solutions of these solvents may be used. Particularly desirable species of solvents for methyl ethyl ketone peroxides are propylene glycols and tetrahydrofuryl alcohol. Although the active oxygen content of the formulation can vary widely; in general, the formulations are made up to have an active oxygen content of between about 1 and 6 percent, e.g., 4 percent.

Suitable solvents for ethyl isoamyl ketone peroxide are diethyl ether and ethyl isoamyl ketone.

Examples of non-ketonic organic diperoxides and dihydroperoxides are (a) 2,5-dimethyl-2,5-bis(2-ethyl hexanoyl peroxy) hexane, (b) 2,5-dimethyl-2,5-di(t-butyl-peroxy)hexane, (c) 2,5 - dimethylhexane-2,5-di(peroxylaurate), (d) 2,5 - dimethyl-2,5-di(methylperoxy)hexane, (e) 2,5-dimethylhexane-2,5-di(peroxyethylcarbonate), (f) 1,1,4,4-tetramethyl-7-benzyl-cyclo - 4,7 - diperoxynonane, (g) 2,5-dimethylhexane - 2,5 - dihydroperoxide, (h) di-t-butyl diperoxyphthalate, and (i) 2,5-dimethylhexane-2,5-diperoxybenzoate.

2,5-dimethyl-2,5-bis(2-ethyl hexanoyl peroxy)hexane can be obtained in a solvent known as Lupersol 256 which is a trade designation and which is commercially available from Wallace & Tiernan, Inc. 2,5-dimethyl-2,5-di(t-butylperoxy)hexane can be prepared by the method given in U.S. Pat. No. 3,086,966. Organic diperoxides (c) through (f) can be prepared by the method given in U.S. Pat. No. 3,117,166.

The catalyst system of this invention can contain between 0.2 and 2.0 weight percent of sodium methoxide when an inhibitor of the picric acid type is present in the polyester resin system.

As defined within the scope of this invention, an inhabitor is a material whose primary function is to retard or inhibit internal polymerization of the polyester constituent of the resinous composition. An inhibitor can therefore alternatively be termed a "stabilizer." A variety of phenolic materials have been used heretofore as inhibitors for this purpose. Among such materials are phenol itself, the monoalkyl phenols, such as for example, ortho-, meta-, paracresol, a mixture of said isomers; alkyl phenols having a plurality of such substituents as ethyl, propyl, butyl and higher alkyl radicals attached to the ring; and the like. Also, the polyhydric phenols may be used, such as catechol, resorcinol, hydroquinone or mixtures of these or partially alkylated polyhydric phenols, including such compounds as tertiary-butyl catechol and compounds which have several alkyl groups present. Also operable are the phenols which have alkoxy groups present such as eugenol, guaiacol and similar phenols. Other specific phenolic materials are p-benzoquinone, 2,5-diphenyl-p-benzoquinone, 2,5-d-t-amyl hydroquinone, 2,5-di-t-butyl hydroquinone, toluhydrokuinone, 2,5-di-t-butyl quinone p-octylphenyl salicylate, resorcinol mono benzoate, 2,4,5-trihydroxy butyrophenone, 2,5-diphenol quinone monotertiary butyl and toluquinone.

Other inhibitors are tetrabromocatechol, picric acid, 2,4-dinitrophenol, N-nitrosodiethylamine, dinitro-o-cresol, etc. The amount of inhibitor which can be overcome by the catalyst of this invention generally ranges from about 900 to about 40,000 p.p.m. by weight based on the mixture of polyester resin, catalyst and promoter. This depends in part on the nature of the polyester resin, etc.

Any of the various known polyester resin systems containing up to 40,000 p.p.m. of inhibitor can be cured by the catalyst system of this invention. Various useful polyester resin systems are given in the following paragraphs.

The preferred unsaturated polymerizable mixtures to be cured by the process of this invention are conventional classes of resins known in the prior art. The most preferred polyester resins are prepared by the esterification of alpha, beta unsaturated polybasic acids, and dihydric alcohols. Certain compounds of this type may be indicated generically as follows:

where, —M— represents an unsaturated dibasic acid residue and —G— represents a dihydric alcohol residue.

Modifying dibasic acids may also be used in the polyester resin compositions. Representative dihydric alcohols and unsaturated polybasic acids are shown below.

In preparing unsaturated polyesters which may be employed in the practice of the present invention, the alcohol component may comprise ethylene glycol, diethylene glycol or propylene glycol, or one of the group of solid polyethylene glycols designated as "carbowax."

Polyethylene glycols such as the 'Carbowaxes" are understood to have molecular weight above 300. Those most useful for this invention have weights below 4000 and preferably are in a range of about 1000 to 2000, e.g., 1500.

The acid component usually comprises an alpha, beta-ethylenically unsaturated polycarboxylic acid such as maleic, fumaric or itaconic acid, or the well-known derivatives of these polycarboxylic acids having ethylenic unsaturation in alpha-beta relation to the carboxyl group. Polybasic acids such as aconitic acid, tricarballylic acid or citric acid may also be employed. A plurality of such acids also may be mixed with each other, if so desired. In many instances, it may be desirable to include a dicarboxylic acid free of ethylenic unsaturation. Examples of this latter type of dicarboxylic acid include phthalic acid or terephthalic acid, which, although they contain double bonds in the benzene ring, do not undergo addition reaction with monomer compounds and may, therefore, be considered as being the equivalent of saturated compounds. Likewise, aliphatic dicarboxylic acids such as succinic acid, adipic acid, sebacic acid, or azelaic acid may be substituted for a part of the alpha, beta-ethylenically unsaturated dicarboxylic acid. The proportion of the non-ethylene acid with respect to the alpha, beta-ethylenically unsaturated acid is susceptible of wide variation. A molecular proportion of 0.25 to 12 moles of saturated acid and/or aromatic diacids per mole of unsaturated acid is usually used for commercial applications.

In preparing the polyester, a small excess (usually 5 or 10 percent) of the dihydric alcohol is usually employed. The conditions of the esterification reaction are those conventionally employed in preparing esters. For example, the mixture of the alcohol and the acid is heated in a vented container or under an inert atmosphere until the stoichiometric amount of water of reaction is expelled from the system, which usually occurs in a temperature range of about 150 to 200° C. The reaction is continued until water ceases to evolve or until the acid value is reduced to a reasonable low point, e.g., within a range of about 5 to 50, or until the mixture becomes highly viscous or even solid when it is cooled. Usually these conditions are attained in a period of 2 to 20 hours. In any event, the reaction is concluded before the product becomes infusible and insoluble because of the advanced stage of polymerization.

The ethylenically unsaturated monomers may be selected from the following general list:

(1) Monoolefinic hydrocarbons, that is, monomers containing only atoms of hydrogen and carbon, such as styrene, alpha-methyl styrene, alpha-ethyl styrene, alpha-butyl styrene and vinyl toluene, and the like;

(2) Halogenated monoolefinic hydrocarbons, that is, monomers containing carbon hydrogen and one or more halogen atoms such as alpha-chlorostyrene, alpha-bromostyrene, 2,5-dichlorostyrene, 2,5-dibromostyrene, 3,4-dichlorostyrene, 3,4-difluorostyrene, ortho-, meta- and para-fluorostyrenes, 2,6 - dichlorostyrene, 2,6 - difluorostyrene, 3-fluoro-4-chlorostyrene, 2,4,5-trichlorostyrene, dichloromonofluorostyrenes, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1- diiodoethylene, and the like.

(3) Esters of organic and inorganic acids such as vinyl acetate, vinyl propionate, vinyl butyrate, vinyl iso- butyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate, methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate and dodecyl acrylate, isopropenyl acetate, isopropenyl propionate, isopropenyl butyrate, isopropenyl valerate, isopropenyl caproate, isopropenyl enanthate, isopropenyl benzoate, isopropenyl p-chlorozenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chlorocarbonate, allyl formate, allyl acetate, allyl propionate, allyl butyrate, allyl valerate allyl caproate, diallyl phthalate, diallyl succinate, diethylene glycol bis(allyl-carbonate), allyl 3,5,5-trimethylhexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl trioacetate, diallyl - 3,4,5,6,7,7 - hexachloro-4-endomethylene tetrahydrophthalate, as well as methallyl esters corresponding to the above allyl esters, as well as esters from such alkenyl alcohols as beta-ethyl allyl alcohol, beta-propyl allyl alcohol, 1-buten-4-ol, 2-methyl-buten-1-ol-4, 2(2,2-dimethylpropyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate, amyl alpha cyano acrylate and decyl alpha-cyano acrylate;

Dimethyl maleate, diethyl maleate, diallyl maleate, dimethyl fumarate, dimethallyl fumarate, diethyl aconitate and glutaconate;

(4) Organic nitriles such as acrylonitrile, methacrylonitrile, ethacrylonitrile, crotonitrile, and the like;

(5) Acid monomers such as acrylic acid, methacrylic acid, crotonic acid, 3-butenoic acid, angelic acid, tiglic acid, aconitic acid, and the like;

(6) Amides such as acrylamide, alpha-methyl acrylamide, N-phenyl acrylamide, n-methyl, N-phenyl acrylamide, and the like.

The preferred monomers are liquid compounds soluble in the polyester component. They will contain the

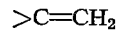

group and preferably the latter will be attached to a negative radical such as a benzene ring, a chlorine atom, an ester linkage, a nitrile group or the like. They should be free of carbon-carbon conjugated double bonds.

The monomer component or components may be employed over a relatively broad range, but, usually, the amount thereof upon a weight basis will be less than that of the polyester component. Usually, the percentage of monomer will fall within a range of about 10 to 45 or 50 percent by weight of the total mixture of polyester and monomer. The preferred range of monomer is about 20 to 40 percent, in most instances.

The catalysts of this invention can be used to cure the polyester resin systems disclosed in co-pending applications Ser. No. 782,735; Ser. No. 782,710; Ser. No. 782,-709; Ser. No. 782,748; Ser. No. 782,747; Ser. No. 782,-708; Ser. No. 782,727; Ser. No. 782,711; Ser. No. 782,-749; Ser. No. 782,750; Ser. No. 782,759; and Ser. No. 782, 757; applicants in all of the foregoing applications are E. E. Stahly and E. W. Lard; all of the aforegoing applications being filed on Dec. 10, 1968; each application having a common assignee with this application. Those applications disclose polyester resin systems containing over 900 p.p.m. of inhibitor.

The curing time of the polyester resin systems varies between about 1 minute and about 24 hours, but more generally, between about 30 minutes and about 4 hours. This time span depends, in part, upon the type of polyester resin, the amount of catalyst, the amount of inhibitor, and so forth. The curing temperature of the polyester resin systems varies between about 15° C. and about 250° C. Preferably, the polyester resin system can be cured at room temperature (15° to 30° C.).

As the scope of useful polyester resin systems is extensive, the type of promoter which can be used in those systems is also extensive. A few exemplary promoters are given in the following paragraphs.

One of the promoter types which can be used in the polyester resin systems is a cobalt salt which is capable of being dissolved in the resinous composition. Suitable soluble cobalt salts are such as cobalt naphthenate, cobalt tallate, cobalt octoate or any other higher fatty acid salt of cobalt. The amount of cobalt salt can be varied from about 0.001 to 0.3 percent of the salt calculated as dissolved metallic cobalt based on the total weight of the resin components, catalyst and promoter mixture employed. One the same basis, the preferred amount of cobalt metal ranges from about 0.02 to 0.15 percent.

The vanadium promoters disclosed in U.S. Pat. No. 3,333,021 also are useful.

Another useful promoter type material is a variety of amine promoters. Suitable amine promoters are disclosed in U.S. Pat. No. 2,480,928. The promoters are described therein as tertiary monoamines which contain attached to the nitrogen atom two functionally aliphatic radicals selected from the group consisting of alkyl hydrocarbons, hydroxy-substituted alkyl hydrocarbons and aralkyl hydrocarbons and one aromatic radical selected from the group consisting of aryl hydrocarbons, azo-substituted aryl hydrocarbons, amino-substituted aryl hydrocarbons, hydroxy-substituted aryl hydrocarbons, and aldehyde-substituted aryl hydrocarbons, and aldehyde-substituted aralkyl hydrocarbons, and salts thereof. Specific examples of this class are the following: dimethylaniline, diethylaniline, di-n-propylaniline, dimethyl-p-toluidine, dimethyl-o-toluidine, dimethyl-alpha-naphthylamine, methyl benzyl aniline, p-dimethylaminoazobenzene, N,N-dimethyl-m-aminophenol, p-hydroxy-N,N-di-(beta-hydroxyethyl)aniline, p-dimethylaminophenyl oxalate, p-dimethvylaminophenyl acetate, and p-dimethylaminobenzaldehyde. Additionally, the promoter can be a tertiary alkyl amine, a hydroxy alkyl amine or an acid salt thereof as a promoter. Exemplary of these types of promoters are diethylmethylolamine, triethylamine, tri-isopropylamine, trimethylamine, tri-isopropanolamine, ethyl diethanolamine hydrochloride and the like. Tertiary polyamines are also effective for use in the instant manner, such as for example, tetramethylbutanediamine. The amount of amine promoter useful in the practice of this invention varies between about 0.05 to 1.0 percent based on the resin components, catalyst and promoter. These amine promoters can be used in conjunction with the above cobalt promoters.

The polyester resin systems of this invention can also contain other compatible additives, such as fillers (silica, etc.), $Sb_2O_3$, boric acid, etc.

The following examples illustrate this invention. All percentages and parts therein are by weight, unless otherwise stated.

EXAMPLE 1

An uncured polyester resin system, containing 18.1 weight percent fiber glass (silica), 1.5 weight percent cobalt octoate, 3.7 weight percent Lupersol 224, 2.7 weight percent Lupersol 256, and 74.0 weight percent polyester resin components, was prepared. The uncured polyester resin system also contained 1.0 mole percent tetrabromocatechol (inhibitor), based upon the above enumerated materials. The polyester resin components were 10 moles diethylene glycol, 4 moles maleic anhydride, 5 moles chlorendric anhydride, 1 mole adipic acid and 10 moles styrene. Before the styrene was added, the polyester was prepared by heating the mixture of the diethylene glycol, the anhydrides and acid in vacuo for 8 hours at temperatures up to 205° C. At the end of this period, no further water was being evolved, and the product was cooled. To the final mixture, the styrene was blended in when the product was cooled to 70° C. At the end of the styrene addition, the temperature was below 50° C. Lupersol 224 is a trade designation for a solution of 3,5 - dimethyl-3,5-dihydroxy-1,2-peroxycyclopentane (50 percent), having an active oxygen content of 4.0 percent, which is commercially available from the Lucidol Division of Wallace & Tiernan, Inc. The organic ketone peroxide in Lupersol 224 is 3,5-dimethyl-3,5-dihydroxy-1,2-peroxycyclopentane, which has the formula:

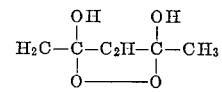

(See U.S. Pat. No. 3,377,407.) Lupersol 256 is a trade designation for a solution of 2,5-dimethyl-2,5-bis(2-ethyl hexanoylperoxy)hexane (90 percent), having an active oxygen content of 6.7 percent, which is commercially available from the Lucidol Division of Wallace & Tiernan, Inc. The uncured polyester resin system was prepared by weighing the polyester resin into a beaker. The following added in the order listed: (1) sodium methoxide, (2) cobalt octoate, (3) Lupersol 256, (4) Lupersol 224. Each addition was followed by thorough mixing. The sample was then poured into a mold alternating layers of resin and fiber glass matting and allowed to cure.

The mixed polyester resin system containing the catalysts and promoters was cured by heating between 77° F. and 180° F. for 25 minutes. The curing is an exothermic auto-accelerating reaction. The resin system gelled after 20 minutes and the peak temperature was 250° F. A well-cured polyester resin was obtained. After 24 hours, the flexural modulus was 500,000 p.s.i. This example represents the preferred embodiment of this invention.

EXAMPLE 2

Example 1 was repeated, except that the inhibitor was picric acid (0.3 mole percent). A well-cured polyester resin was obtained.

EXAMPLE 3

Example 1 was repeated, except that the resin system contained 12.5 weight percent glass, 1.5 weight percent cobalt octoate, 3.5 weight percent Lupersol 224, 2.7 weight percent Lupersol 256, 0.2 weight percent sodium methoxide, and 88.6 weight percent of the resin components (used in Example 1). The uncured polyester resin system also contained 0.2 mole percent picric acid. A well-cured resin was obtained. The cured resin had a modulus K of 136 p.s.i. after 2 hours, 159 p.s.i. after 4 hours, and 172 p.s.i. after 24 hours.

EXAMPLE 4

Example 3 was repeated, except that the inhibitor was tetrabromocatechol (1.0 mole percent). A well-cured polyester resin was obtained.

EXAMPLE 5

Example 1 was repeated, except that the resin system contained 20.4 weight percent glass, 1.5 weight percent cobalt octoate, 2.8 weight percent Lupersol 224, 1.9 weight percent Lupersol 256, and 73.4 weight percent of the resin components. The uncured polyester resin system also contained 1.0 mole percent tetrabromocatechol. The polyester components were 10 moles diethylene glycol, 5 moles maleic anhydride, 5 moles chlorendic anhydride, 10 moles styrene, and 0.02 mole cobalt naphthenate. A well-cured polyester resin was obtained.

EXAMPLE 6

Example 1 was repeated, except that the resin system contained 14.8 weight percent glass, 1.35 weight percent cobalt octoate, 6.65 weight percent Lupersol 224, 1.98 weight percent Lupersol 256, 0.18 weight percent sodium methoxide, and 75.04 weight percent of the resin components (used in Example 5). The uncured polyester resin system also contained 0.25 mole percent tetrabromcatechol and 0.25 mole percent picric. A well-cured resin was obtained. The cured resin had a modulus K of 444 p.s.i. after 24 hours.

EXAMPLE 7

Example 1 was repeated, except that the resin system contained 19.0 weight percent glass, 1.35 weight percent cobalt octoate, 6.65 weight percent Lupersol 24, 1.98 weight percent Lupersol 256, 1.20 weight percent sodium methoxide, and 69.49 weight percent of the resin components (used in Example 5). The uncured polyester resin system also contained 0.25 mole percent tetrabromocatechol and 0.25 mole percent picric. A well-cured resin was obtained. The cured resin had a modulus K of 554 p.s.i. after 24 hours.

EXAMPLE 8

Example 1 was repeated, except that the resin system contained 18.5 weight percent glass, 1.97 weight percent cobalt octoate, 7.07 weight percent Lupersol 224, 1.97 weight percent Lupersol 256, 0.55 weight percent sodium methoxide, and 67.97 weight percent of the resin components (used in Example 5). The uncured polyester resin system also contained 0.25 mole percent tetrabromocaechol and 0.25 mole percent picric. A well-cured resin was obtained. The cured resin had a modulus K of 332 p.s.i. after 5 hours, and 510 p.s.i. after 24 hours.

EXAMPLE 9

Example 1 was repeated, except that the inhibitor was phenol (0.5 mole percent). A well-cured polyester resin was obtained.

EXAMPLE 10

Example 1 was repeated, except that the inhibitor was para-cresol (0.3 mole percent). A well-cured polyester resin was obtained.

EXAMPLE 11

Example 1 was repeated, except that the inhibitor was hydroquinone (0.6 mole percent). A well-cured polyester resin was obtained.

EXAMPLE 12

Example 1 was repeated, except that the inhibitor was tertiary-butyl catechol (0.2 mole percent). A well-cured polyester resin was obtained.

EXAMPLE 13

Example 1 was repeated, except that the inhibitor was toluquinone (1.0 mole percent). A well-cured polyester resin was obtained.

EXAMPLE 14

Example 1 was repeated, except that the inhibitor was 2,5-di-t-butylquinone (0.2 mole percent). A well-cured polyester resin was obtained.

EXAMPLE 15

Example 1 was repeated, except that the inhibitor was p-octylphenyl salicylate (0.4 mole percent). A well-cured polyester resin was obtained.

EXAMPLE 16

Example 1 was repeated, except that the inhibitor was resorcinol monobenzoate (0.8 mole percent). A well-cured polyester resin was obtained.

EXAMPLE 17

Example 1 was repeated, except that the polyester resin was prepared and comprised as follows: A mixture of 75 parts by weight of an unsaturated polyester obtained by esterification of 1.5 moles of maleic acid anhydride and 3.5 moles of phthalic acid anhydride with 5 moles of 1,3-butanediol with 25 parts by weight of styrene to which 0.02 part by weight of hydroquinone was added.

A well-cured polyester resin was obtained.

EXAMPLE 18

Example 1 was repeated, except that the polyester resin was prepared and comprised as follows: A mixture of 70 parts by weight of an unsaturated polyester obtained from 2.7 moles of maleic acid anhydride, 4.4 moles of phthalic acid anhydride, 3.9 moles of ethylene glycol, and 3.4 moles of diethylene glycol (2,2'-dihydroxy ethyl ether) with 30 parts by weight of styrene.

A well-cured polyester resin was obtained.

EXAMPLE 19

Example 1 was repeated, except that the polyester resin was prepared and comprised as follows: A mixture of 840 parts of diethylene glycol, 159 parts of ethylene glycol, 592 parts of phthalic anhydride and 588 parts of maleic anhydride was added to a reaction flask equipped with mechanical stirrer, thermometer and a Dean-Stark water trap. The reaction mixture was kept under an atmosphere of carbon dioxide during the entire course of the reaction. Following the addition of the mixture to the flask, the mixture was heated to mobility at which time stirring was commenced. At a temperature of 105° C., the mixture became homogeneous and started to esterify as manifested by the distillation of water. A controlled rate of heating (cooling needed at 100° C.) was applied so that after one hour, 150° C. was reached and after 4 hours, 190° C. was reached. The temperature was then raised to 200° to 210° C. under a vacuum of 2 mm. while still bubbling in $CO_2$. After heating for 3.5 hours at 200° to 210° C., the polyester had an acid number of less than 40 and was cooled to 100° C. and 1040 grams of styrene containing 0.01 percent by weight hydroquinone was stirred in. The homogeneous clear mixture was removed from the flask and cured.

A well-cured polyester resin was obtained.

EXAMPLE 20

Example 1 was repeated, except that the polyester resin was prepared and comprised as follows. A polyester resin composition was made by mixing 10.88 parts of phthalic anhydride and 7.21 parts of maleic anhydride with 11.20 parts of propylene glycol and 0.57 part of ethylene glycol. The mixture was esterified at 200° to 210° C. to an acid number of 50, cooled, and 14 parts of styrene was stirred in.

A well-cured polyester resin was obtained.

EXAMPLE 21

Example 1 was repeated, except that the polyester resin was prepared and comprised as follows. A polyester resin was prepared by esterifying 13.4 parts of diethylene glycol, 2.94 parts of maleic anhydride and 13.15 parts of adipic acid at 205° to 210° C. in the presence of .00416 part of hydroquinone until an acid number of 30 was reached.

The cooled polyester was converted to a liquid resin by the addition of 24.8 parts of styrene which contained .00136 part of hydroquinone and copper naphthenate sufficient to yield a concentration of one part per million of copper based on the finished resin.

A well-cured polyester resin was obtained.

EXAMPLE 22

Example 1 was repeated, except that the polyester resin was prepared and comprised as follows: A dipropylene glycol-maleic anhydride polyester resin was made by adding 17.45 parts of dipropylene glycol to 12.50 parts of maleic anhydride. The mixture was esterified at 205° to 210° C. to obtain a resin with an acid number of 25, and 15 parts of styrene was added.

A well-cured polyester resin was obtained.

EXAMPLE 23

Example 1 was repeated, except that the polyester resin was prepared and comprised as follows: A polyester was prepared from 116 parts of fumaric acid, 134 parts of dipropylene glycol, and 151 parts of wood rosin. The mixture was esterified by heating at 200° to 240° C. until an acid number below 100 was obtained. The mixture was diluted with half its weight of styrene.

A well-cured polyester resin was obtained.

EXAMPLE 24

Example 1 was repeated, except that Lupersol DDA-30 was used instead of Lupersol 224. Lupersol DDA-30 is the trade designation for a stable, clear solution of methyl ethyl ketone peroxide in dimethyl phthalate and diallyl phthalate. It contains 30 percent methyl ethyl ketone peroxides, has an active oxygen content of 5.5 percent (min.), has an sp. gr. (25°/25° C.) of 1.1128, and has a flash point (micro open cup) of 215° to 220° F. (It is soluble in diallyl phthalate, dimethyl phthalate, methyl benzyl phthalate, ethyl acetate, esters, ethers, and ethyl alcohol; insoluble in water, carbon tetrachloride, cyclohexanone, and ethylene glycol; and moderately soluble in styrene, benzene, and toluene.) Lupersol DDA-30 is commercially available from the Lucidol Division of the Wallace & Tiernan, Inc.

A well-cured polyester resin was obtained.

EXAMPLE 25

Example 1 was repeated, except that Lupersol DDM was used instead of Lupersol 224. Lupersol DDM is the trade designation for a clear, colorless solution of methyl ethyl ketone peroxides and hydroperoxides in dimethyl phthalate. It is a water-white liquid containing 60 percent methyl ethyl ketone peroxides (as $C_8H_{10}O_4$) and having oxygen content of 11 percent (min.). (It is readily soluble in most synthetic resin monomers.) Lupersol DDM is commercially available from the Lucidol Division of the Wallace & Tiernan, Inc.

A well-cured polyester resin was obtained.

EXAMPLE 26

Example 1 was repeated, except that Lupersol Delta was used instead of Lupersol 224. Lupersol Delta is the trade designation for a clear, colorless solution of methyl ethyl ketone peroxides and hydroperoxides in dimethyl phthalate. It is a water-white liquid with a methyl ethyl ketone peroxide content of 60 percent (as $C_8H_{16}O_4$) and has an active oxygen content of 11 percent (min.), sp. gr. (25° C.) of 1.093 (min.), and has a flash point (micro open cup) that is above 122° F. It is soluble in alcohols, ethers, ketones, and acetate esters; insoluble in water, glycerine, petroleum ether, cyclohexane, and mineral oil; and slightly soluble in chlorinated hydrocarbons, tricresyl phosphate, toluene, and dioctyl phthalate. Lupersol Delta is commercially available from the Lucidol Division of the Wallace & Tiernan, Inc.

A well-cured polyester resin was obtained.

EXAMPLE 27

Example 1 was repeated, except that Lupersol Delta-X was used instead of Lupersol 224. Lupersol Delta-X is the trade designation for a clear, colorless solution of methyl ketone peroxides and hydroperoxides in dimethyl phthalate. Lupersol Delta-X is commercially available from the Lucidol Division of the Wallace & Tiernan, Inc.

EXAMPLE 28

Example 1 was repeated, except that Lupersol DNF was used instead of Lupersol 224. Lupersol DNF is the trade designation for a liquid ketone peroxide solution that is both self-extinguishing and non-shock sensitive. It is a water-white liquid containing 58 percent ketone peroxides, has an active oxygen content of 10.6 percent and has a sp. gr. (25° C.) of 1.0309. It is soluble in methyl ethyl ketone, ethyl alcohol, methanol, ethylene glycol, ethyl acetate, ethyl ether, and n-butanol; and insoluble in toluene, cyclohexane dibutylphthalate, tricresyl phosphate, carbon tetrachloride, and chlorobenzene. Lupersol DNF is commercially available from the Lucidol Division of the Wallace & Tiernan, Inc.

A well-cured polyester resin was obtained.

EXAMPLE 29

Example 1 was repeated, except that the resin system contained 0.8 gram of cobalt accelerator 254, 3.0 grams of Lupersol 224, 50 grams of resin components (used in Example 1), 0.7 gram of a 50/50 mixture of sodium methoxide, and 0.2 gram mole percent picric acid. The gel time was 1.2 minutes and the peak temperature was 205° F. The resultant polymer was rubbery and flexible after 24 hours, and 48 hours of cure were required to reach 300,000 p.s.i. flexural strength.

EXAMPLE 30

Polyester composition A was prepared by admixing and heating (as in Example 1) 10 moles of diethylene glycol, 4 moles of maleic anhydride, 5 moles of chlorendic anhydride, 1 mole of adipic acid, 10 moles of styrene, and about 0.02 mole of cobalt octoate. There was a total halogen content of about 25 percent.

EXAMPLE 31

Polyester composition B was prepared by admixing and heating (as in Example 1) 10 moles of diethylene glycol, 5 moles of maleic anhydride, 5 moles of chlorendic anhydride, and 10 moles of styrene. There was a total halogen content of about 25 percent. (A cobalt compound, or other catalyst, must be placed in the composition before it can be cured after storage.)

EXAMPLE 32

Polyester composition C was prepared by admixing and heating (as in Example 1) 10 moles of diethylene glycol, 5 moles of maleic anhydride, 5 moles of chlorendic anhydride, 10 moles styrene, and 0.02 mole of cobalt octoate. There was a total halogen content of about 25 percent.

EXAMPLE 33

Polyester composition D was prepared by admixing and heating (as in Example 1) 10 moles of diethylene glycol, 6.2 moles of maleic anhydride, 1.2 moles of tetrabromophthalic anhydride, 2.6 moles of phthalic anhydride and 10 moles of styrene. There was a total halogen content of about 9 to 11 percent. (A cobalt compound, or other catalyst, must be placed in the composition before it can be cured after storage.)

EXAMPLE 34

Polyester composition E was prepared by admixing and heating (as in Example 1) 10 moles of diethylene glycol, 6.2 moles of maleic anhydride, 1.2 moles of tetrabromophthalic anhydride, 2.6 moles of phthalic anhydride, 10 moles of styrene, and about 0.002 mole of cobalt octoate (per 100 grams of the aforegoing resin components). There was a total halogen content of about 9 to 11 percent.

EXAMPLE 35

Example 1 was repeated, except that initially 1.0 mole percent of tetrabromocatechol was admixed with polyester A and the admixture was stored for 15 days at a temperature of 125° F. The admixture was cured using the same amount of catalysts as shown in Example 1, gelling in 12 minutes, and the peak temperature was 205° F. The resultant polymer was well-cured.

EXAMPLE 36

Example 35 was repeated, except that the cobalt octoate was not placed in the admixture until just before the catalysts were added. A well-cured polymer was obtained.

EXAMPLE 37

Example 1 was repeated, except that initially picric acid (1.0 mole percent) was admixed with polyester composition B and the admixture was stored for 20 days at a temperature of 125° F. The admixture was cured, gelling in 15 minutes, and the peak temperature was 250° F. The resultant polymer was well-cured.

EXAMPLE 38

Example 37 was repeated, except that polyester composition C was used and that the cobalt octoate was not placed in the admixture until just before it was cured. A well-cured polymer was obtained.

EXAMPLE 39

Example 1 was repeated, except that initially 2-nitroresorcinol (1.0 mole percent) was admixed with polyester composition D and the admixture was stored for 40 days at a temperature of 70° F. The admixture was cured using the catalysts of Example 1, gelling occurred in 5 minutes, and the peak temperature was 265° F. The resultant polymer was well-cured.

EXAMPLE 40

Example 39 was repeated, except that the cobalt octoate was not placed in the admixture (containing polyester composition E) until just before it was cured. A well-cured polymer was obtained.

EXAMPLE 41

Example 41 was repeated, except that initially tetrabromocatechol (1.0 mole percent) was admixed with polyester composition D and the admixture was stored for 15 days at a temperature of 100° F. The admixture was cured, gelling occurred in 10 minutes, and the peak temperature was 210° F. The resultant polymer was well-cured.

EXAMPLE 42

Example 41 was repeated, except that the cobalt octoate was not placed in the admixture (containing polyester composition E) until just before it was cured. A well-cured polymer was obtained.

EXAMPLE 43

Example 1 was repeated, except that initially chloranil (1.0 mole percent) was admixed with polyester composition D and the admixture was stored for 15 days at a temperature of 125° F. The admixture was cured, gelling in 5 minutes, and the peak temperature was 250° F. The resultant polymer was well-cured.

EXAMPLE 44

Example 43 was repeated, except that the cobalt octoate was not placed in the admixture (containing polyester composition E) until just before it was cured. A well-cured polymer was obtained.

EXAMPLE 45

Example 1 was repeated, except that initially 2-(2-aminomethylamino)-5-nitropyridine (1.0 mole percent) was admixed with polyester composition B and the admixture was stored for 60 days at a temperature of 70° F. The admixture was cured, gelling in 5 minutes, and the peak temperature was 260° F. The resultant polymer was well-cured.

EXAMPLE 46

Example 45 was repeated, except that the cobalt octoate was not placed in the admixture (containing polyester composition C) until just before it was cured. A well-cured polymer was obtained.

EXAMPLE 47

Example 1 was repeated, except that initially p-quinonedioxime (1.0 mole percent) was admixed with polyester composition B and the admixture was stored for 80 days at a temperature of 70° F. The admixture was cured, gelling in 5 minutes, and the peak temperature was 250° F. The resultant polymer was well-cured.

EXAMPLE 48

Example 47 was repeated, except that the cobalt octoate was not placed in the admixture (containing polyester composition C) until just before it was cured. A well-cured polymer was obtained.

EXAMPLE 49

Example 1 was repeated, except that initially 2-hydroxy-1,4-naphthoquinone (1.0 mole percent) was admixed with polyester composition B and the admixture was stored for 72 days at a temperature of 70° F. The admixture was cured, gelling in 5 minutes, and the peak temperature was 250° F. The resultant polymer was well-cured.

EXAMPLE 50

Example 49 was repeated, except that the cobalt octoate was not placed in the admixture (containing polyester composition C) until just before it was cured. A well-cured polymer was obtained.

EXAMPLE 51

Example 1 was repeated, except that initially 1,4-naphthalenediol (1.0 mole percent) was admixed with polyester composition B and the admixture was stored for 30 days at a temperature of 70° F. The admixture was cured, gelling in 8 to 10 minutes, and the peak temperature was 260° F. The resultant polymer was well-cured.

EXAMPLE 52

Example 51 was repeated, except that the cobalt octoate was not placed in the admixture (containing the polyester composition C) until just before it was cured. A well-cured polymer was obtained.

EXAMPLE 53

Example 1 was repeated, except that initially 2,5-dimethyl-p-benzoquinone (1.0 mole percent) was admixed with polyester composition B and the admixture was stored for 110 days at a temperature of 70° F. The admixture was cured, gelling in 2 minutes, and the peak temperature was 260° F. The resultant polymer was well-cured.

EXAMPLE 54

Example 53 was repeated, except that the cobalt octoate was not placed in the admixture (containing polyester composition C) until just before it was cured. A well-cured polymer was obtained.

EXAMPLE 55

Example 1 was repeated, except that initially 2-hydroxypyridine (1.0 mole percent) was admixed with polyester composition D and the admixture was stored for 30 days at a temperature of 70° F. The admixture was cured, gelling in 8 to 10 minutes, and the peak temperature was 260° F. The resultant polymer was well-cured.

EXAMPLE 56

Example 55 was repeated, except that the cobalt octoate was not placed in the admixture (containing polyester composition E) until just before it was cured. A well-cured polymer was obtained.

EXAMPLE 57

Example 1 was repeated, except that initially cyanogen bromide (0.5 mole percent in isopropanol 0.9 mole percent) was admixed with polyester composition B and the admixture was stored for 150 days at a temperature of 70° F. The admixture was cured, gelling in less than 2 minutes, and the peak temperature was 260° F. The resultant polymer was well-cured.

EXAMPLE 58

Example 57 was repeated, except that the cobalt octoate was not placed in the admixture (containing polyester composition C) until just before it was cured. A well-cured polymer was obtained.

EXAMPLE 59

Example 1 was repeated, except that Lupersol 6 was used instead of Lupersol 224. Lupersol 6 is the trade designation for bis(1-hydrocyclohexyl)peroxide. Lupersol 6, one part by weight, was dissolved in methanol, 2 parts by weight, before it was used. A well-cured polyester resin was obtained.

EXAMPLE 60

Example 1 was repeated, except that Lupersol 256 was replaced with 2,5-dimethylhexane-2,5-dihydroperoxide. A well-cured polyester resin was obtained.

EXAMPLE 61

Example 1 was repeated, except that Lupersol 256 was replaced with Lupersol 118. Lupersol 118 has a minimum active oxygen content of 7.66 percent and is 2,5-dimethyl-hexane-2,5-diperoxybenzoate, which has the following structural formula:

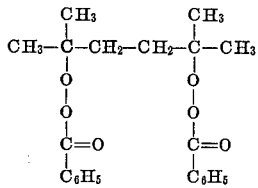

A well-cured polyester resin was obtained.

EXAMPLE 62

Example 1 was repeated, except that Lupersol 256 was replaced with Lupersol KBD. Lupersol KDB is a clear solution of di-t-butyl diperoxyphthalate (50.0 percent minimum content) in dibutyl phthalate. It has a minimum active oxygen content of 5.16 percent. di-t-butyl diperoxyphthalate has the following structural formula:

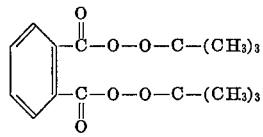

A well-cured polyester resin was obtained.

EXAMPLE 63

Example 1 was repeated, except that the Lupersol 224 was replaced with:

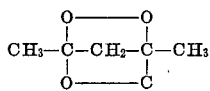

A well-cured polyester resin was obtained.

EXAMPLE 64

Example 1 was repeated, except that Lupersol 224 was replaced with:

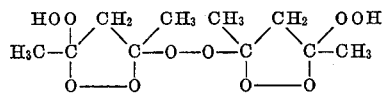

A well-cured polyester resin was obtained.

EXAMPLE 65

An uncured polyester resin system containing 18.1 weight percent fiber glass, 1.5 weight percent cobalt octoate, 3.7 weight percent 3,5-dimethyl-3,5-dihydroxy-1,2-peroxycyclopentane solution (30 parts dissolved 70 parts of propylene glycol), 2.7 weight percent Lupersol 256, and 74.0 weight percent of the polyester resin components of Example 1. The uncured polyester resin system also contained 1.0 mole percent tetrabromocatechol (inhibitor), based upon the above enumerated. The styrene was added and the polyester was then cured as in Example 1.

EXAMPLE 66

Example 60 was repeated, except that the solvent in the 1,2-peroxycyclopentane solution was hexylene glycol. A well-cured polyester resin was obtained.

EXAMPLE 67

Example 60 was repeated, except that the solvent in the 1,2-peroxycyclopentane solution was a 50/50 mixture of water and hexylene glycol. A well-cured polyester resin was obtained.

EXAMPLE 68

Example 6 was repeated, except that propylene glycol was used in place of diethylene glycol. A well-cured polyester resin was obtained.

EXAMPLE 69

Example 65 was repeated, except that the 1,2-peroxycyclopentane solution was comprised of 30 percent 3,5-dimethyl-3,5-dihydroxy-1,2 - peroxycyclopentane, 12 percent water, 29 percent triethyl phosphate and 29 percent N-alkyl-2-pyrrolidinone. A well-cured resin was obtained.

It is claimed:
1. A process of preparing a cured polyester resin which comprises:
  (a) admixing (i) about 90 to about 95 parts per hundred by weight of polyester components comprising between about 9/10 and about 1/20 of its weight of at least one monomer, (ii) about 900 to about 40,000 parts per million parts by weight of inhibitor, and (iii) about 2 to about 10 parts per hundred parts by weight of (1) at least one organic ketone peroxide and (2) at least one organic non-ketonic diperoxide, the weight ratio of said ketone peroxide to said organic non-ketonic diperoxide being between about 2:1 to about 4:1;
  (b) maintaining said admixture at a temperature between about 15° C. and about 250° C. for a period of time which ranges between about 1 minute and about 24 hours.
2. The process of claim 1 wherein the admixture includes about 0.2 to about 2.0 parts per hundred parts by weight of sodium methoxide.
3. The process of claim 1 wherein the admixture is heated for a period of time which ranges between about 30 minutes and about 4 hours.
4. The process of claim 1 wherein the admixture includes about 1 to about 3 parts per hundred parts by weight of at least one promoter.
5. The process of claim 1 wherein the admixture includes from about 10 to about 20 parts per hundred parts by weight of filler.
6. The process of claim 5 wherein the filler is silica.

7. The process of claim 1 wherein said curing is initiated at a temperature above 10° C.

8. The process of claim 1 wherein said curing is effected without supplying heat to the mixture.

9. The process of claim 1 wherein said monomer component or at least one of said monomer components is an unsaturated monomer.

10. The process of claim 1 wherein said organic ketone peroxide is methyl ethyl ketone peroxide.

11. The process of claim 10 wherein said methyl ethyl ketone peroxide is dissolved in dimethyl phthalate.

12. The process of claim 1 wherein said organic non-ketonic diperoxide is 2,5-dimethyl-2,5-bis(2-ethyl hexanoyl peroxy)hexane.

13. The process of claim 1 wherein said ketone peroxide is 3,5-dimethyl-3,5-dihydroxy-1,2-peroxycyclopentane and said organic non-ketonic diperoxide is 2,5-dimethyl-2,5-bis(2-ethyl hexanoyl peroxy)hexane.

14. The process of claim 1 wherein said organic non-ketonic peroxide is 3,5-dimethyl-3,5-dihydroxy-1,2-peroxycyclopentane.

15. The process of claim 14 wherein said organic ketone peroxide is dissolved in hexylene glycol.

16. The process of claim 14 wherein said organic ketone peroxide is dissolved in a solution consisting of about equal proportions of hexylene glycol and water.

References Cited

UNITED STATES PATENTS 2,524,536  10/1950  Nordlander et al.
260—75(T)UX
2,566,206  8/1951  Hyman _____ 260—75(T)X ALLAN LIEBERMAN, Primary Examiner L. T. JACOBS, Assistant Examiner U.S. Cl. X.R.

260—75